US012804074B2

(12) United States Patent
Dromazou et al.

(10) Patent No.: US 12,804,074 B2
(45) Date of Patent: Nov. 17, 2026

(54) METHOD AND SYSTEM FOR CLUSTERING EMERGENCY CALLS

(71) Applicant: Unify Patente GmbH & Co. KG, Munich (DE)

(72) Inventors: Nikolitsa Dromazou, Neo Irakleio (GR); Antonios Kouzanidis, Nea Ionia (GR); Maria Manolaki, Athens (GR); Athanasios Pagonis, Vrilissia (GR); Areti Psaropoulou, Chalandri (GR); Ariadni Liakopoulou, Fyli (GR)

(73) Assignee: Unity Beteiligungsverwaltung GmbH & Co. Kg, Munich (DE)

( * ) Notice: Subject to any disclaimer, the term of this patent is extended or adjusted under 35 U.S.C. 154(b) by 162 days.

(21) Appl. No.: 18/659,361

(22) Filed: May 9, 2024

(65) Prior Publication Data

US 2024/0388656 A1 Nov. 21, 2024

(30) Foreign Application Priority Data

May 19, 2023 (EP) .................................... 23174351

(51) Int. Cl.
*H04M 3/51* (2006.01)
*H04W 4/90* (2018.01)

(52) U.S. Cl.
CPC .......... *H04M 3/5116* (2013.01); *H04W 4/90* (2018.02); *H04M 2242/04* (2013.01)

(58) Field of Classification Search
CPC .. H04L 65/65; H04L 65/1069; H04M 3/5116; H04M 3/00; H04M 2242/04; H04W 4/90; H04W 4/22; G06F 9/30149; G06F 16/955; G06F 16/9538; G06F 16/951
USPC .......................................................... 379/45
See application file for complete search history.

(56) References Cited

U.S. PATENT DOCUMENTS

| | | | |
|---|---|---|---|
| 4,996,704 A | 2/1991 | Brunson | |
| 6,195,676 B1 * | 2/2001 | Spix | G06F 9/30149 714/E11.21 |
| 8,280,025 B2 | 10/2012 | Sharpe et al. | |
| 10,594,816 B2 | 3/2020 | Mottur et al. | |
| 2002/0054670 A1 | 5/2002 | Shtivelman | |
| 2006/0223494 A1 | 10/2006 | Chmaytelli et al. | |
| 2013/0078943 A1 | 3/2013 | Biage et al. | |

(Continued)

FOREIGN PATENT DOCUMENTS

CN 103246740 A * 8/2013

OTHER PUBLICATIONS

EP; Extended Search Report dated Nov. 14, 2023 in Application Serial No. EP 23174351.9.

*Primary Examiner* — Md S Elahee

(57) ABSTRACT

The present invention relates to a method for clustering emergency calls and a system to perform the method. With the present invention, the resource utilization of a PSAP center can significantly be improved, and at the same time, the response time of all calls that reach the PSAP center is reduced. This is achieved by providing a mechanism that allows clustering of calls, and an advanced handling of a majority of them. A personalized message is used to communicate an ongoing major incident to callers to pre-handle a burst of calls. Therefore, the call agent only has to take calls that have not already been successfully handled by the personalized messages.

14 Claims, 7 Drawing Sheets

(56) References Cited

U.S. PATENT DOCUMENTS

| | | | |
|---|---|---|---|
| 2016/0337831 | A1 | 11/2016 | Piett et al. |
| 2018/0053401 | A1 | 2/2018 | Martin et al. |

* cited by examiner

METHOD AND SYSTEM FOR CLUSTERING EMERGENCY CALLS

CROSS REFERENCE TO RELATED APPLICATIONS

This application claims the benefit and priority of European Patent Application No. EP 23174351.9 Filed on May 19, 2023, the contents of which are hereby incorporated herein by reference.

DESCRIPTION

The present invention relates to a method for clustering emergency calls and a system to perform the method.

Emergency calling services are a cornerstone of public safety. They allow every citizen to contact experienced professionals which reside on the Public Safety Answering Point (PSAP) side to communicate the details of an emergency incident and get help from first responders. Occasionally, the call center of a PSAP receives an overwhelming amount of emergency calls. In case of major incidents (e.g. a car accident on a highway reported by many eyewitnesses, or a fire incident in a large building), a burst of calls reaches the PSAP service center in a limited timeframe. Within this limited timeframe, some of the calls are successfully served, while a significant proportion of them wait in the queue or become abandoned by the caller.

Based on the NG9-1-1 or NG1-1-2 standards issued, for example, by the National Emergency Number Association (NENA) organization, the operation call center of the emergency service should try to call back the emergency caller in case of abandoned calls. The PSAP has a specific capacity to serve the calls, as the queue is critically increasing. Thus, there is a major delay in serving incoming calls. At the same time the call back of abandoned calls increases the queue and adds additional delay on the response time, as well.

U.S. 2002/0054670 A1 relates to emergency call load management for call centers. An interactive voice response (IVR) unit associated with a switching apparatus is used to divert calls in special conditions, such as during emergencies or disasters when calls to certain destinations may suddenly increase dramatically. Calls are diverted depending on call destination and/or pre-programmed triggers, such as a call load threshold experienced by the switching apparatus or for a specific destination. The IVR unit in some cases negotiates with callers for priority to further route calls and may play pre-recorded messages.

U.S. Pat. No. 4,996,704 B relates to electronic messaging systems with additional message storage capability. The document focuses on an electronic messaging system which allows a system subscriber to record a plurality of "customized" announcement messages. Each such message is associated with at least one calling party. Upon receiving an incoming communication for a system subscriber, the system automatically utilizes the calling party identification for that incoming communication to retrieve any associated customized message.

U.S. Pat. No. 8,280,025 B2 describes automated unique call announcements for incoming telephone calls. When a call is received at a mobile or wired telephone, a variety of data about the calling party, for example, caller identification and profile data for the calling party and data associated with the called party, for example, scheduling data, contact data, and contextual data, such as time of the day, may be used for generating a text-to-speech message that may be played to the called party as a unique call announcement.

U.S. Pat. No. 10,594,816 B2 is related to capturing, composing and sending a targeted message to nearby users requesting assistance or other requests for information from individuals or organizations. This document deals with a method of sending targeted messages to nearby users requesting assistance based on their location.

U.S. 2006/0223494 A1 relates to a system and method for sending and receiving emergency announcements from a server to a client device. The announcements are sent based on the location of the client device and a time-window.

As is apparent from the above, the prior art concentrates on static call data to create a message to communicate with a caller without clustering dynamic data from previous calls. Dynamic data are all the data presented at the signaling level, e.g. location, Additional Data Record and the feedback provided by a caller while he/she is replying to a personalized message. As more incidents come in and are served, the tree of data that is created for characterization as "a clustering of calls" becomes more dynamic. Thus, there is no proposal from the state of the art on how to improve the resource utilization of the PSAP center and to reduce the response time in emergency networks.

Therefore, the present invention is based on the object to provide a method, and a corresponding network system, for clustering emergency calls. In particular, to use the location information in a specific time-window, and additionally, to use the caller's emergency call data in combination with voice stream input to create dynamically personalized messages via a rewarding mechanism.

This object is solved by a method having the features according to claim 1, and a network system having the features of claim 11. Preferred embodiments of the invention are defined in the respective dependent claims.

With the present invention, the resource utilization of a PSAP center can significantly be improved, and at the same time, the response time of all calls that reach the PSAP center is reduced. This is achieved by providing a mechanism that allows clustering of calls and an advanced handling of a majority of them. A personalized message is used to communicate an ongoing major incident to callers to pre-handle a burst of calls. Therefore, the call agent only has to take calls that have not already been successfully handled by the personalized messages.

In the meaning of the invention, a bot is a program, an application or a service which can be implemented in the PSAP(s) or as a cloud service where the PSAP(s) have access.

In the sense of the invention, the method for clustering emergency calls can run automatically or semi automatically.

In the meaning of the invention, a cluster storage is a database for storage of data relating to emergency events, which is located internally in the call handling system of the PSAP or externally close to the PSAP and could be accessible by an Emergency Service Routing Proxy (ESRP) as well in the latter case.

In the meaning of the invention, key data are different information on an emergency event like time, location and severity of the event, and more detailed parameters like provider or device information.

In the meaning of the invention, a clustering event/entry in the cluster storage is created by an established call with a PSAP agent. At this stage, at least the location information, locX, and the event key word(s) are extracted from the call and stored in the cluster storage. The term "matching/same event/entry" in the meaning of the invention is an emergency event whose key data are already stored in the cluster storage and are matched to the key data of an incoming call. The term "new event/entry" in the meaning of the present invention is a new incoming call which was not handled by the system yet.

In the meaning of the present invention, event/RTP key word(s) is/are characteristic word(s) extracted from the voice stream of an incoming call. Examples of key words are flood, thunderstorm, rampage, car crash/accident, fire, terror attack, explosion, shooting/school shooting, or earth quake.

In the meaning of the invention, Additional Data Related (ADR) to an emergency call are emergency call data provided at the signaling level based on the RFC 7852 standard of the Internet Engineering Task Force (IETF). There are four data structures described as additional data on an emergency call:

1. data provider information (ADR Y) including identification and contact information,
2. service information (ADR Z) describing the service that the service provider provides to the caller,
3. device information (ADR X) providing information about the device used to place the call, and
4. owner/subscriber information (ADR W) describing the owner of the device (if provided by the device) or the subscriber information (if provided by a service provider).

These data structures are constructed from sub-data structures, what is referred to as ADR Y.1, ADR Y.2, etc. in the present invention. For example, the owner/subscriber information data structure provides the name of the subscriber as a sub-data structure (being key data ADR W.1).

According to the invention, a method for clustering emergency calls is provided, the method comprising the steps of receiving, by a PSAP, a new emergency event from an ESRP; extracting, by an application, key data regarding the new emergency event; preparing, by the application, a search key for clustering incoming calls belonging to the same event based on the key data extracted in the previous step; checking, by the application, whether a matching event is in a cluster storage based on the extracted key data of the incoming event and the key data of previously reported events in the cluster storage, adding, by the application, further key data into the cluster storage in case a matching event is in the cluster storage; sending, by the application, a personalized message to the emergency caller using the available key data of the matching event in the cluster storage; ending the method.

According to a preferred embodiment, in case no matching event is in the cluster storage, the method further comprises: optimizing, by the application, the search key; adding, by the application, an abandoned event to the abandoned events without clustering in case the optimization is not successful; and ending the method.

According to the invention, abandoned calls are identified based on a SUBSCRIBE-NOTIFY mechanism between the PSAP and an ESRP.

According to the invention, the search key either uses all of the existing key data of the event or only part of them. How many key data are used depends on the key data of already served/reported events that are stored in the cluster storage.

According to yet a further preferred embodiment, the key data of the search key are stored at corresponding optimization levels, preferably wherein there are up to three optimization levels of the search key.

According to another preferred embodiment, in case the optimization of the search key is not successful, the method further comprises: creating, by the application, a new entry of an incoming event into the cluster storage based on the previously prepared search key; moving, by the application, the incoming event to the call handling system; monitoring, by the application, a Real-Time-Protocol (RTP) streaming, and extracting, by the application, event key words; updating, by the application, the entry into the cluster storage with the event key words; ending the method.

According to the invention, event key words include, but are not limited to, fire, thunderstorm, flood, earth quake, car crash/accident, explosion, rampage, school shooting/shooting and/or terror attack.

According to still another preferred embodiment, in case the optimization of the search key is successful, the method further comprises: adding, by the application, further key data into the cluster storage in case a matching event is in the cluster storage; sending, by the application, a personalized message to the emergency caller using the available key data of the matching event in the cluster storage; ending the method.

Further, according to a preferred embodiment, the optimization represents a tree diagram of the emergency data and their connection. The search key starts from a corresponding optimization level based on the key data extracted from a new emergency call.

Usually, the search starts at optimization level 2 having detailed key data and proceeds to all sub-nodes. Thus, the optimization includes extracting key data of an incoming or abandoned call and searching for a matching event in the cluster storage. In case no matching event is found, the search key is reconstructed, and the search is reapplied. If still no matching event is found, the search key is again reconstructed, and the search is again reapplied. If still no matching event is found at level 0, having only the extracted key data location locX, no clustering takes place.

According to another preferred embodiment, in case the optimization of the search key is successful, the method further comprises: optimizing, by the application, the search key, in case no matching event is in the cluster storage. As will be described in greater detail below, the preparation of the search key usually starts with all available key data (level 2). If no matching event is found in the cluster storage, the search key will be optimized to level 1, containing fewer key data. If still no matching event is found in the cluster storage, the search key will be updated even more to level 0, including only the key data time and locX. If a matching event is found in the cluster storage, a personalized message is sent to the emergency caller including the key data corresponding to the respective level. Thus, in level 0, the personalized message will include only the key data locX together with the time. If still no matching event is found at optimization level 0, no clustering takes place.

Also, according to another preferred embodiment, the application is an entity of the emergency system, a part of the PSAP, and/or designed as a bot and/or as an IVR. It is also possible that the application can be running as an external component, for example, as a cloud service where the PSAP has access.

According to yet another preferred embodiment, the key data are selected from the group comprising the time, geolocation (locX) and further parameters like ADR Y, ADR Z, ADR X, and ADR W.

According to still another preferred embodiment, the parameters are selected from Uniform Resource Name (URN) service SOS sub-service, an emergency call data service info-element, or an emergency call data comment-element.

According to yet a further preferred embodiment, the clustering is based on a location (locX) within a time-window t. In one preferred embodiment, the time-window is 20 to 40 minutes, preferably 25 to 35 minutes, more preferably 27 to 33 minutes and most preferably 30 minutes. In another embodiment, the time-window is 45 to 75 minutes, preferably 50 to 70 minutes, more preferably 55 to 65 minutes and most preferably 60 minutes.

According to another preferred embodiment, the time-window t is a configurable parameter set by an administrator.

According to the invention, a system for clustering emergency calls is provided, wherein the system is adapted to perform the steps of the method according to any one of the claims 1 to 10.

According to a preferred embodiment, the system comprises an ESRP, a PSAP, an application, and/or a cluster storage.

According to another preferred embodiment, the application is an entity of the emergency system, a part of the PSAP, and/or designed as a bot and/or IVR. It is also possible that the application can be running as an external component, for example, as a cloud service where the PSAP has access.

According to still another preferred embodiment, the cluster storage contains the key data information in a node-tree architecture which provides a hierarchical way of storing data.

It has also to be noted that aspects of the invention have been described with reference to different subject-matters. In particular, some aspects or embodiments have been described with reference to apparatus type claims whereas other aspects have been described with reference to method type claims. However, a person skilled in the art will gather from the above and the following description that, unless otherwise notified, in addition to any combination between features belonging to one type of subject-matter also any combination between features relating to different types of subject-matters is considered to be disclosed with this text. In particular, combinations between features relating to the apparatus type claims and features relating to the method type claims are considered to be disclosed. The invention and embodiments thereof will be described below in further detail in connection with the drawing(s).

Figure 1:
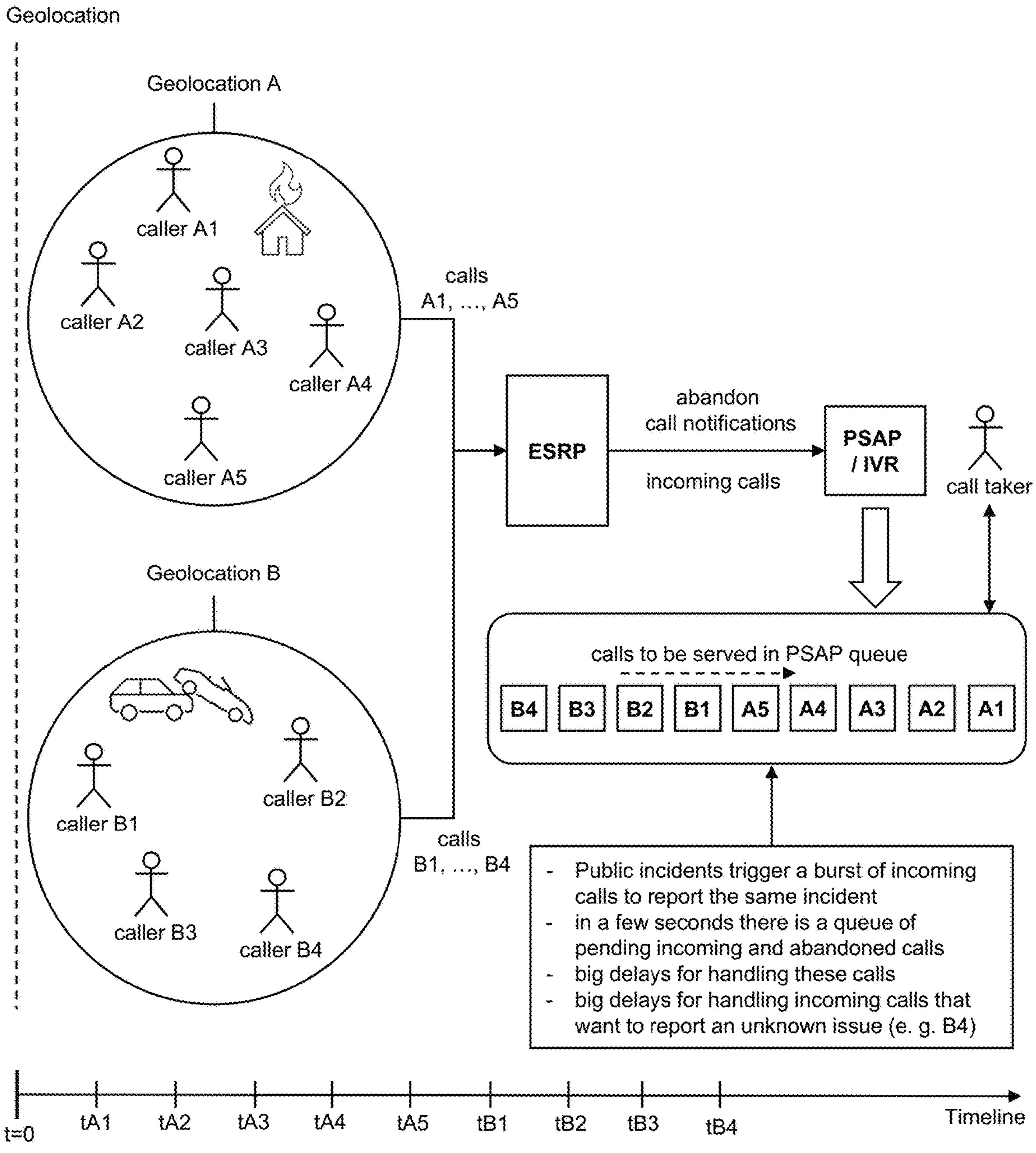
FIG. 1 shows a schematic illustration of the problem underlying the present invention.

FIG. 1 presents in a schematical illustration an overview of the underlying problem the invention is solving by the inventive method. In case of an emergency, a PSAP service center receives emergency calls about said emergency event, also referred to as emergency incident or simply incident, based on the standard routing mechanism of the Emergency Services IP Network (ESInet). In the sense of the invention, the ESInet is a managed Internet Protocol (IP) network that is used for emergency services communications, and which can be shared by all Public Safety Agencies (PSAPs). It provides the IP transport infrastructure upon which independent application platforms and core services can be deployed, including, but not restricted to, those necessary for providing Next Generation 9-1-1 or 1-1-2 (NG9-1-1 or NG1-1-2) services. NG9-1-1 or NG1-1-2 are IP-based systems comprised of hardware, software, data, and operational policies and procedures that provide standardized interfaces from emergency call and message services to support emergency communications; process all types of emergency calls, including voice, data, and multimedia information; acquire and integrate additional emergency call data useful to call routing and handling; deliver the emergency calls, messages, and data to the appropriate PSAP and other appropriate emergency entities; support data or video communications needs for coordinated incident response and management.

In FIG. 1, there are two major public incidents at two different locations exemplified. In geolocation A, the incident is a fire of a large building, and in geolocation B, the incident is a car accident, for example, on a highway. Each incident is reported by many eyewitnesses. In general, incoming calls about an emergency event are detected by an ESRP which routes the incoming calls to a PSAP. In the present example, there are several people calling about the fire as well as several people calling about the car accident at the same time. Therefore, a burst of calls reach the PSAP service center in a limited time frame, i.e., a few seconds to a few minutes. Within this limited time frame some of the calls are successfully served, while a significant proportion of them wait on the queue to be served or become abandoned by the caller. Based on the NG9-1-1 standards issued by the NENA, the operation call center of the emergency service should try to call back the emergency caller. The PSAP has a specific capacity to serve the calls, as the queue is critically increasing. Thus, there is a major delay in serving incoming calls. At the same time, the call back of abandoned calls increases the queue and adds additional delay to the response time as well.

Figure 2:
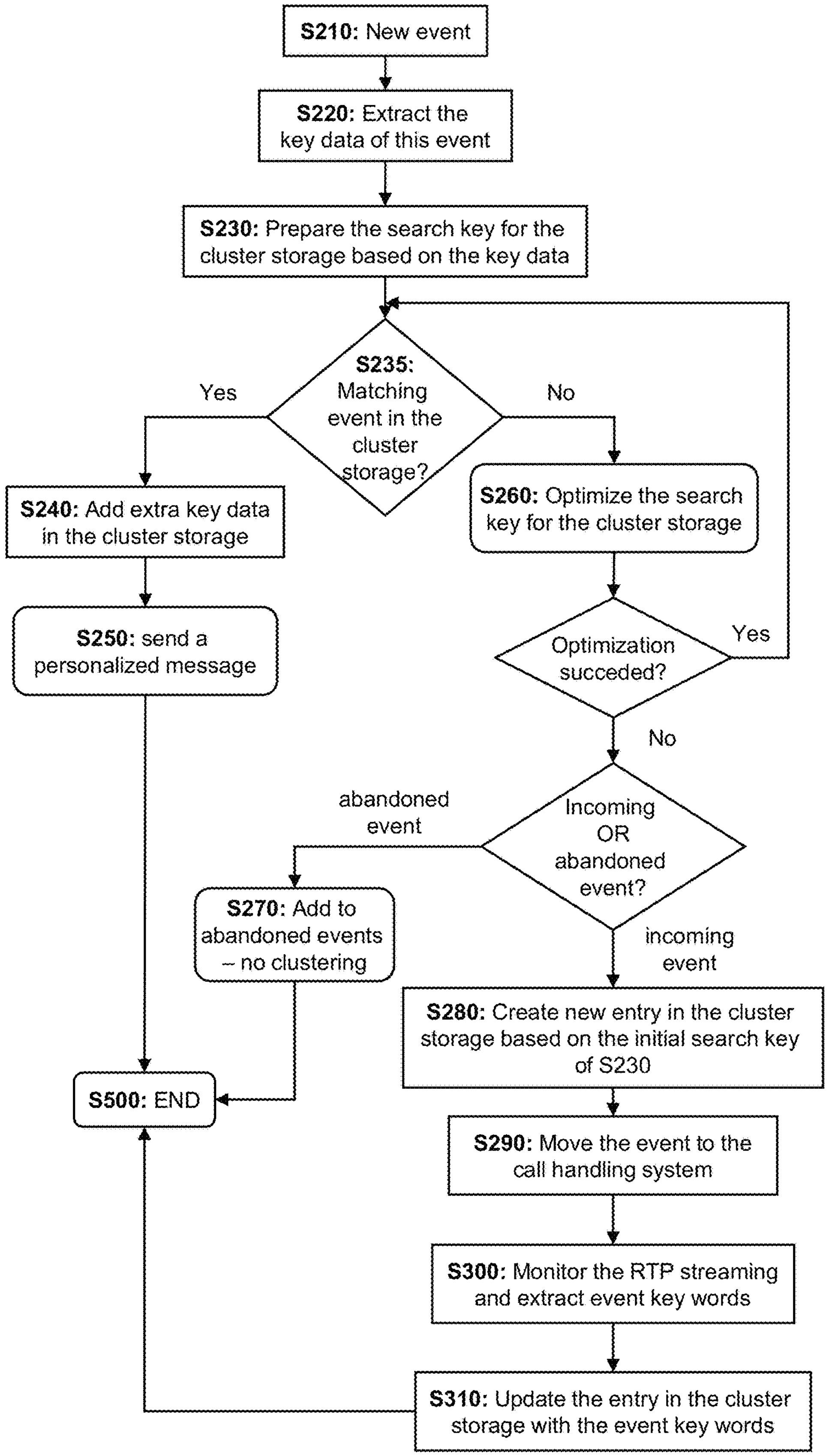
FIG. 2 shows a flowchart of process steps of the method according to an embodiment of the invention.

FIG. 2 shows a flowchart of an overview of the steps of the method according to an embodiment of the invention. A new emergency event is detected by an ESRP and routed to a PSAP. In a first step S210, the new event is received by the PSAP and handled by it. In step S220, key data of this event are extracted by an application. Key data are specific information provided on an emergency event. These data include, but are not limited to, the time of the call, the geolocation locX of the caller, and more detailed parameters like URN service SOS sub.service, Emergency call data service info element with its sub-elements, or an emergency call data comment element. This will help to prepare the search key on the clustering, which is done in step S230 by the application. The search for matching events in the cluster storage is performed on different optimization levels using a node-tree architecture. Thus, the search key uses either all the existing key data of the incoming event or only part of them. Initially, the search key is constructed with all the available key data and a search operation is applied for a matching event in the cluster storage. In step S240, in case of a successful search result in step S235, i.e. a matching event is in the cluster storage, additional key data of the incoming event are added into the cluster storage to provide more detailed information. Additional key data are those data that have not been extracted with the already existing entry in the cluster storage but are new key data extracted with the incoming event to be clustered. Then, in step S250, one or more personalized, dynamically created message(s) is/are constructed and sent to the caller to communicate with the caller. The caller will interact with the system based on the personalized message(s), and the method ends in step S500.

If no matching event is found in the cluster storage in step S235, the search key is optimized in step S260 to an upper level, thus, there are less key data in the search key, and another search is re-applied. If the optimization of the search key is unsuccessful (no matching event is found in the cluster storage), the further process handling differentiates based on the event type:

- For abandoned events, there is no special handling. In step S270 the abandoned event is added to the abandoned events without clustering, and the method ends in step S500.
- For incoming events, in step S280 a new entry is created in the cluster storage based on the initial search key of step S230 and the event is moved to the call handling system in step S290. At this point, a session is established between the caller and a call taker in step S300, and event key words are extracted by monitoring an RTP streaming. This is done by using speech recognition software like Google Home, Siri, Amazon Alexa etc. In step S310, the clustering entry in the cluster storage is updated with the event key words found in said incoming call, and the method ends in step S500.

Figure 3:
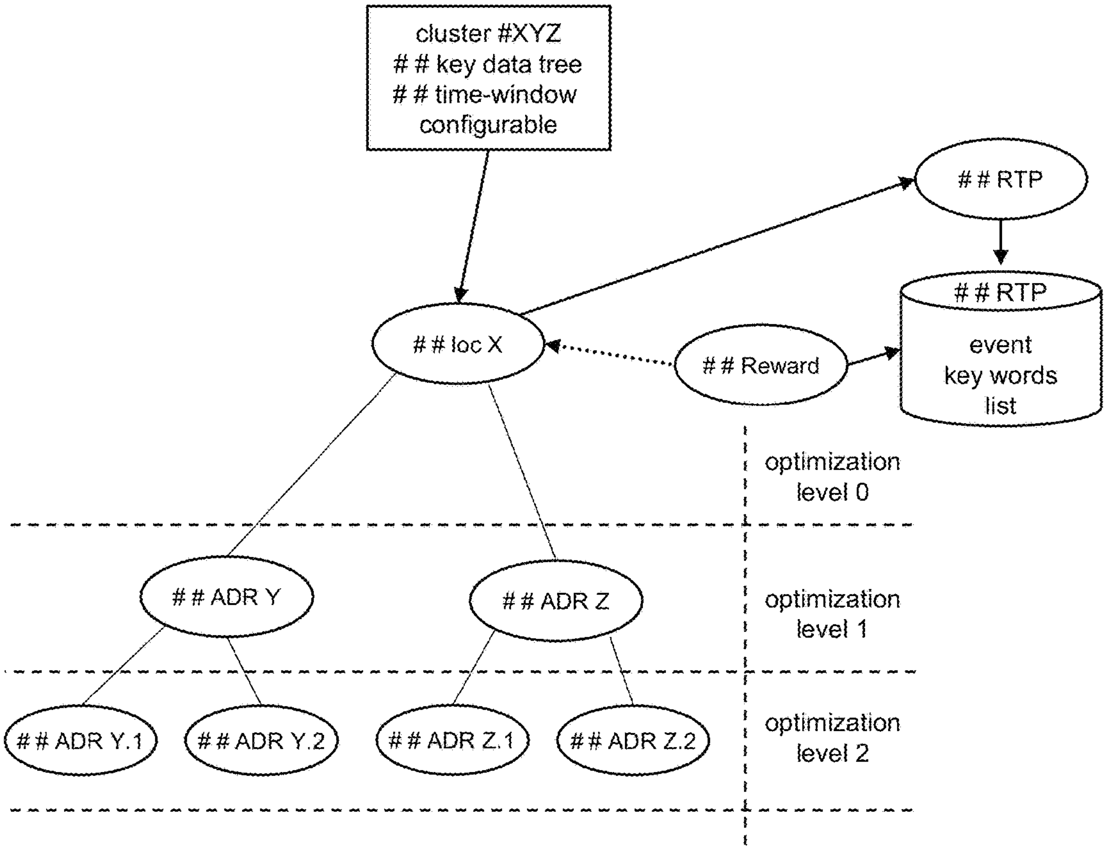
FIG. 3 shows a chart of the mechanism of the cluster storage according to still another embodiment of the invention.

FIG. 3 shows in a schematical illustration the cluster storage system of the invention. Said system contains the key data information in a node-tree architecture. The application focuses on key data which are the location locX, the time and the more detailed parameters like ADR Y and ADR Z with their subsets ADR Y.1, ADR Y.2 and ADR Z.1, ADR Z.2, respectively. In the present invention, ADR Y and ADR Z include, but are not limited to, any additional data extracted by an event. As already mentioned above, in general, ADR data include ADR Y, ADR Z, ADR X and ADR W. It could be any URN service SOS sub-service (RFC 5031) and/or any additional data related to an emergency call like emergency call data service info-element with its sub-elements, an emergency call data comment-element (RFC 7852) or any available data at a feature consideration.

A clustering entry in the cluster storage is created by an established call with a PSAP agent. At this stage, the location of the caller plus his voice stream input are acquired. Therefore, for a new event to be added to the cluster storage as a clustering event/entry it is required to have at least locX and an RTP key word(s) info. In the present invention, events are clustered based on a location locX within a pre-defined time-window t which is a configurable parameter set by an administrator. Thus, events with a matching locX but on a different time-window will represent different clustering entries. As can be seen in FIG. 3, there are different optimization levels in the cluster storage, and each level corresponds to specific key data elements. A higher-level number holds key data of greater accuracy. More specifically, the key data location locX is stored at optimization level 0. The key data ADR Y and ADR Z are stored at optimization level 1. Key data ADR Y.1, ADR Y.2, ADR Z.1 and ADR Z.2 are stored at optimization level 2 as they depict more accurate information. At each clustering entry there is a list of RTP streaming key words which is stored in the cluster storage. Those key words include, but are not limited to fire, car crash, flood, thunderstorm, terror attack, earth quake, rampage, shooting/school shooting and explosion. As described above, the clustering entry initially contains an RTP key word(s) info provided on an already served call. The method will further populate the RTP key words list by the caller of an incoming event feedback acquired via the proposed mechanism that interacts between the caller and a bot (i.e. IVR) system. The voice stream input from the caller has a significant role as it describes an incident. For this reason, the RTP key words play a major role on the mechanism and more specific at the personalized messages creation. A reward mechanism is applied to point out the major incidents. An RTP key word is rewarded in any case the caller gives his/her consent to the personalized message. The rewards are also depicted to the clustering entry as they verify common incidents on a location in a pre-defined time-window.

Figure 4:
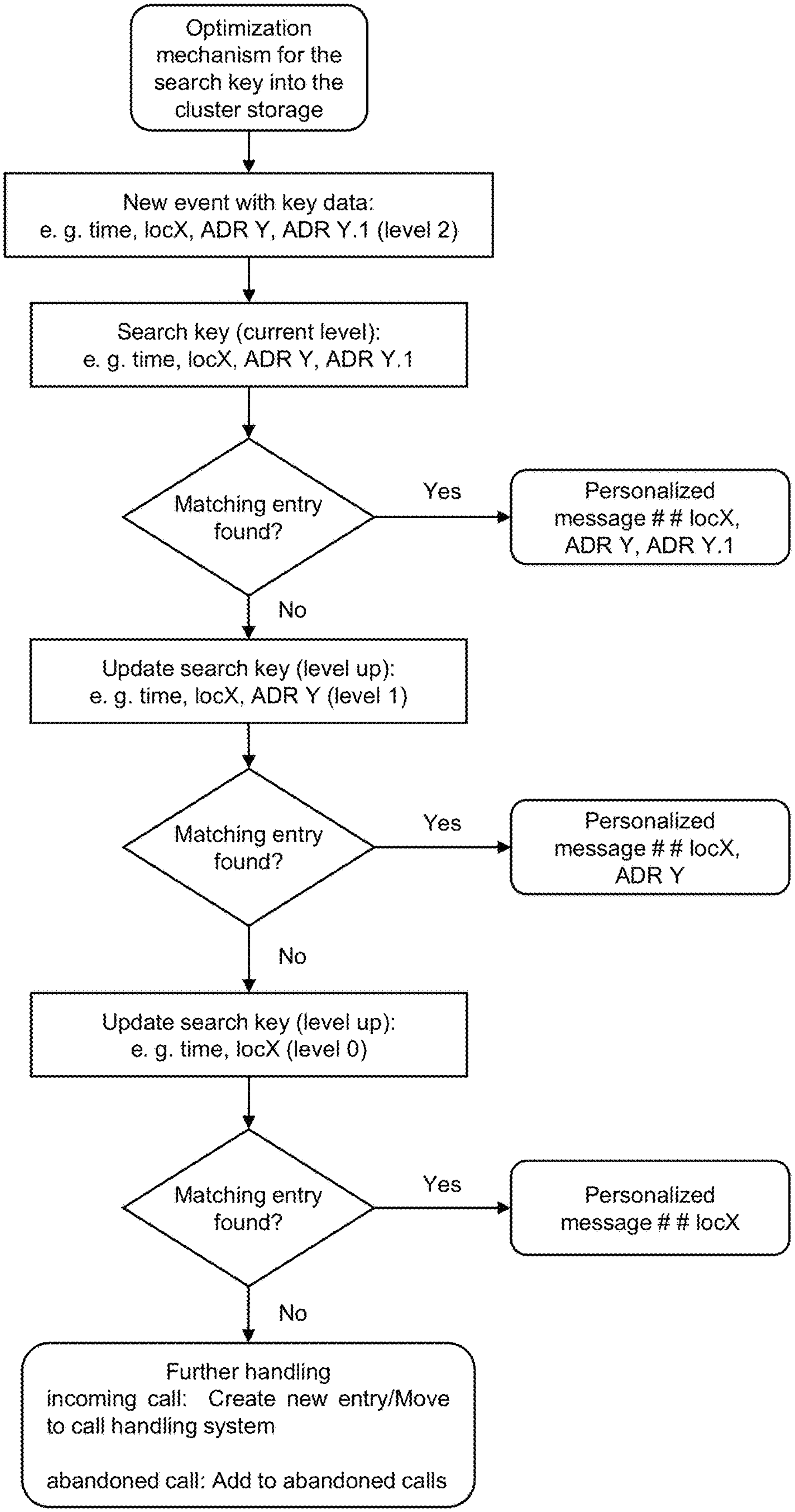
FIG. 4 shows a flowchart of the optimization mechanism according to another embodiment of the invention.

FIG. 4 is an overview of the optimization mechanism for the search key algorithm in the cluster storage system. Initially, the search key includes all the available key data of the new event (optimization level 2). In case no matching entry is found in the cluster storage, the search key is optimized at an upper optimization level, i.e. level 1, for example, containing the key data time, locX and ADR Y, and a search is re-applied. If still no matching entry is found, the search key is further optimized to level 0. The optimization ends when the top level of optimization has been reached (level 0). If still no matching entry is found at optimization level 0, there is no clustering. If a matching entry is found at either optimization level, a personalized message is sent to the caller including the key data of the respective level.

Example: New event with key data time, locX, ADR Y, ADR Y.1/clustering entry key data: time, locX

| Search-key | Level | Search Result |
|---|---|---|
| time, locX, ADR Y, ADR Y.1 | 2 | Failed |
| time, locX, ADR Y | 1 | Failed |
| time, locX | 0 | Success |

Figure 5:
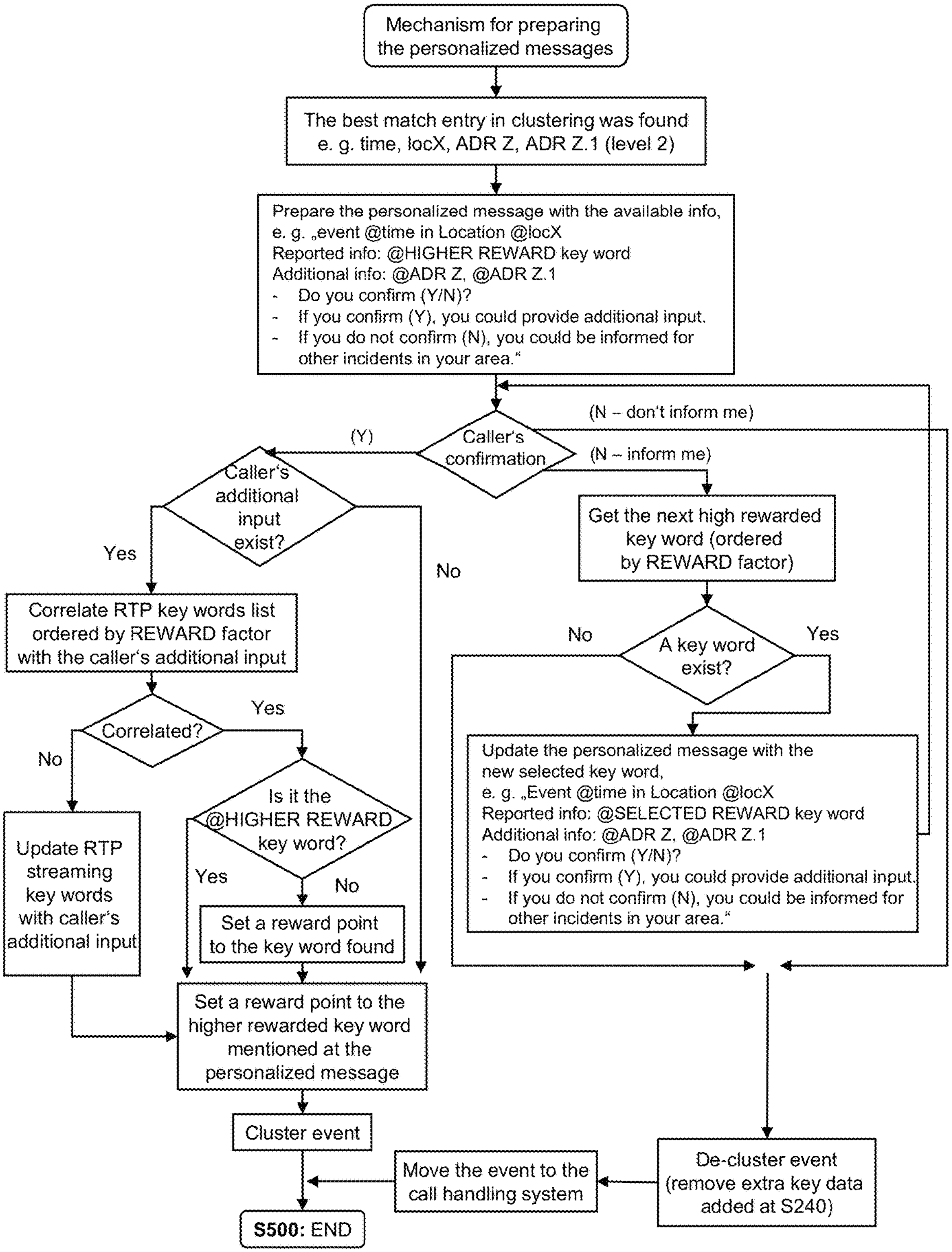
FIG. 5 shows a flowchart of process steps for the preparation of personalized messages according to another embodiment of the invention.

FIG. 5 shows an overview of the steps of personalized message interaction. According to the invention, an optimization mechanism is applied to find the best matching entry in the cluster storage. In case a matching entry is found, a personalized message to be send to the caller is created. In the embodiment depicted in FIG. 5, a matching entry of a new event is found in the cluster storage at level 2, i.e., including the key data time, locX, ADR Z and ADR Z.1. A personalized message (PM) is created by using the available key data of the matching entry in the cluster storage. The PM always contains the time info, the locX info and the higher rewarded RTP key word on the RTP key words list. Additionally, it contains any of the rest of the available key data (i.e., ADR Y/Y.1/Y.2, ADR Z/Z.1/Z.2, ADR X/X.1/X.2, ADR W/W.1/W.2). The application prompts the caller to confirm whether the content of the PM corresponds to his/her incident or not. In case the caller confirms, he/she could provide additional input. Otherwise, he/she could be informed for other known incidents in his/her location. The higher rewarded RTP key word is selected at the PM by the application, as the main purpose is to publish the major incident reported. In this way the caller will provide either a quick verification or can give extra input. The extra input could either reward another existing key word in the RTP key words list or differentiate.

Example of a personalized message:

| |
|---|
| Event time in locX |
| Reported info: key word |
| Additional info: ADR Y, ADR Y.1, ADR Y.2, ADR Z, ADR Z.1, ADR Z.2, ADR X, ADR X.1, ADR X.2, ADR W, ADR W.1, ADR W.2 (any available) |
| Do you confirm (Yes (Y)/No (N))? |
| If you confirm (Y), you could provide additional input. |
| If you don't confirm (N), you could be informed for other incidents in your area. |

In case the caller confirms the incident (Y) and gives additional input, the application searches the RTP key words list and correlates the entries of said list, which is ordered according to the reward points, with the caller's additional input. If no correlation exists, the RTP key words list is updated with the callers' input (new key word(s)). The key word mentioned in the PM does get a reward point due to the caller's confirmation, the event is clustered, and the method ends. If a correlation exists, the key word(s) mentioned in the PM and the key word(s) of the caller's additional input is/are compared by the application due to their order (higher or lower rewarded key word, meaning more or less reward points). If the additional info of the caller is the higher rewarded key word mentioned in the PM, said key word gets a reward point, the event is clustered, and the method ends. If the additional info is not the higher rewarded key word mentioned in the PM, the caller's key word gets a reward point. Also, the key word mentioned in the PM gets a reward point due to the confirmation by the caller, the event is clustered, and the method ends. Thus, regardless of a correlation, the key word presented at the PM is rewarded with a reward point because of the caller's consent to the PM. So, the reward system sorts the incidents based on their probability, and the application gets faster.

In case the caller does confirm the incident but does not give any additional input, the application rewards the key word mentioned in the PM sent to the caller, the event is clustered, and the method ends.

In case the caller does not confirm the incident (N) and wants to get informed about incidents in his/her area, the application selects the key word from the key words list with the next lower value (less reward points) in order to update the PM with said new key word. This updated PM is sent to the caller for confirmation. Thus, the caller will be informed about other incidents occurring at his/her location at the pre-defined time-period. If no key word exists in the key words list having less reward points than the key word initially sent to the caller, the event is de-clustered, and the extra key data added into the cluster storage in step S240 are removed. The event is moved to the call handling system and the method ends. If a key word exists having less reward points, then the key word originally sent in the PM, the PM is updated with said new selected key word to request new input from the caller. Here, the caller can again choose between confirmation of the event (Y/N) and addition of additional data and more information.

In the last possible case, the caller does not confirm the incident and does not want to get informed. In this case the event is de-clustered, the extra key data added in step S240 are removed from the cluster storage, the call is moved to the call handling system, and the method ends.

Figure 6:
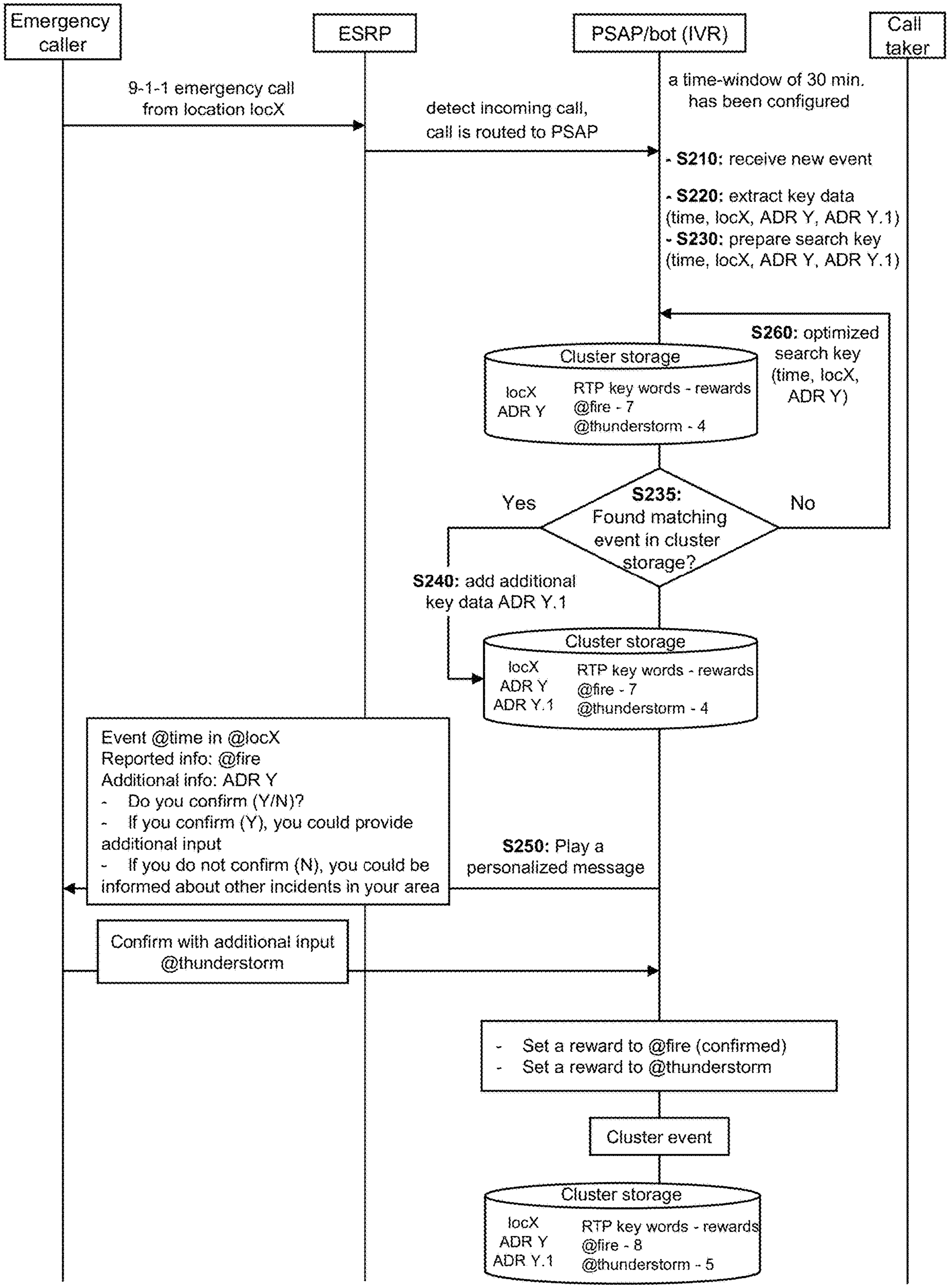
FIG. 6 shows a schematic illustration of an embodiment using a time-window of 30 minutes according to the invention.

FIG. 6 illustrates another embodiment of the invention. In this embodiment, an incoming call needs to be served in the most efficient way in case of a major public incident. A 30-minutes time-window is set by the administrator for the cluster storage. The cluster storage system contains entries from previously established calls along with the respective reward points, thus, key words ordered according to their reward points. Also, key data of already reported emergency incidents are in the cluster storage. In the present embodiment, the key data in the cluster storage are locX and ADR Y as well as the key words "fire" with seven reward points and "thunderstorm" with four reward points. Such an entry will be used in the proposed application to make a correlation between the incoming call and an already reported incident.

More specifically, an incoming emergency call from location locX is detected by the ESRP and received by the PSAP in step S210. An application extracts all available key data of this new event in step S220. The collected key data of the incoming call are used to prepare a search key for the clustering in step S230. In the underlying embodiment, said collected key data are time, location locX, ADR Y and ADR Y.1, aiming to find a matching event in the cluster storage. There is a clustering entry in the cluster storage for the same location at the configured time-window supporting only ADR Y data. After failing to match the search key (time, location, ADR Y and ADR Y.1, optimization level 2) of the new event with a clustering event in the cluster storage, the application performs another search one level up (optimization level 1) in step S260, meaning that the optimized search key contains the time, location, and ADR Y. Upon the optimization of the search key in step S260, a matching event is found in the cluster storage in step S235, and the additional key data ADR Y.1 are added into the cluster storage in step S240. Moving forward to step S250, a personalized message (PM) is created and sent to the caller. This message shall contain all event characteristics such as time, location locX, ADR Y as well as the RTP key word "fire" that is highly rewarded. Also, the PM prompts the caller to confirm if he/she called to report said specific event or not as well as give any additional input if he/she wishes.

In the present embodiment, the caller confirms the message with an additional input, i.e., "thunderstorm". Next, the application sets an extra reward point to the key word "fire" because of the message confirmation. Also, the key word "thunderstorm" which was given as an additional input by the caller receives one reward point as it already exists at the RTP key words list in the cluster storage. In this way, the incoming event is clustered. The incoming call was automatically served without a call takers' participation. Thus, the response time of serving the call was reduced and eventually the resource utilization of the PSAP center was optimized.

Figure 7:
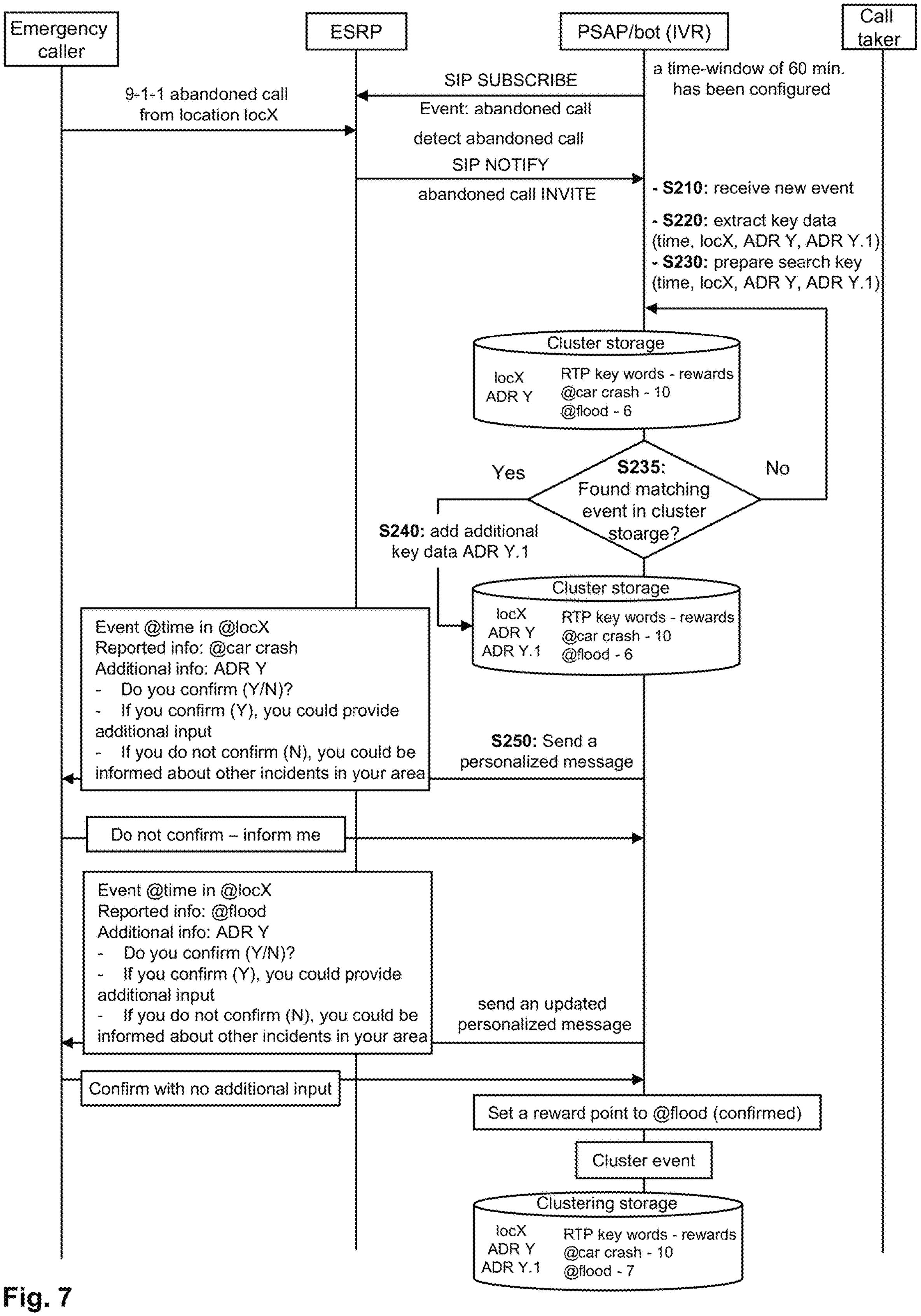
FIG. 7 shows a schematic illustration of another embodiment using a time-window of 60 minutes according to the invention.

FIG. 7 illustrates yet another embodiment of the present invention. In this embodiment, an abandoned call needs to be served in the most efficient way in case of a major public incident. A 60-minutes time-window is set by the administrator for the clustering storage. The storage system contains entries from previously established calls along with the respective reward points, thus, key words ordered according to their reward points and key data of already reported emergency incidents are in the cluster storage. In the present embodiment, the key data in the cluster storage are locX and ADR Y, and the key words are "car crash" with 10 reward points and "flood" with six reward points. Such an entry will be used in the application to make a correlation between the abandoned call with an already reported incident. More specifically, the ESRP detects an abandoned call and sends a SIP NOTIFY message to the PSAP. The new event is received by the PSAP in step S210. In the next step S220 the application extracts all available key data from the abandoned call, in this case time, locX, ADR Y and ADR Y.1. The collected key data of the abandoned call are transformed into the search key in step S230, aiming to find a matching event in the cluster storage. There is an already existing clustering entry in the cluster storage for the same location at the configured time-window supporting only ADR Y data. Thus, there is no matching event in the cluster storage having all key data extracted from the abandoned call (i.e., time, locX, ADR Y and ADR Y.1). After failing to match the search key (time, location, ADR Y and ADR Y.1, optimization level 2) with a clustering entry, the application performs another search at one level up (optimization level 1), meaning that the optimized search key contains the time, location locX, and ADR Y. Upon optimization, in step S235 a matching event is found in the cluster storage, and ADR Y.1 is added to the key data in step S240 as this data is not in the cluster storage yet. In step S250, a personalized message is created and sent to the caller. This message shall contain all event characteristics such as time, location locX, ADR Y as well as the RTP key word "car crash" that is highly rewarded. Also, the personalized message prompts the caller to confirm in case he/she called to report said specific event or not, as well as to give any additional input if he/she wishes. In FIG. 7, the caller does not confirm the message, but he/she wishes to be informed for other incidents in his/her area. An updated personalized message is sent to the caller containing the second highly rewarded RTP key word "flood" next to the key data locX and ADR Y. The caller confirms the message with no additional input. Because of the confirmation by the caller, the application sets an extra reward point to the key word "flood". In this way, the abandoned event is clustered.

The abandoned call was automatically served without a call takers' participation; thus, the response time of serving the call was reduced and eventually the resource utilization of the PSAP center was optimized.

It should be noted that the term "comprising" does not exclude other elements or steps and the "a" or "an" does not exclude a plurality. Further, elements described in association with different embodiments may be combined.

It should also be noted that reference signs in the claims shall not be construed as limiting the scope of the claims.

REFERENCE NUMERALS

PSAP Public Safety Answering Point
IVR Interactive Voice Response
ESRP Emergency Service Routing Proxy
RTP Real-Time-Protocol
locx Location
ADR Additional Data Related to an Emergency Call
Y/N yes/no
S210-S500 method steps S210 to S500

The invention claimed is:

1. A method for clustering emergency calls, the method comprising the steps of:

receiving, by a Public Safety Answering Point, PSAP, a new emergency event from an Emergency Service Routing Proxy, ESRP;

extracting, by an application, key data regarding the new emergency event;

preparing, by the application, a search key for clustering incoming calls belonging to a same event, based on the key data extracted in the previous step;

checking, by the application, whether a matching event is in a cluster storage, based on the extracted key data of the incoming event and key data of previously reported events in the cluster storage, wherein in case no matching event is found based on the extracted key data, the application optimizes the search key and re-applies the search;

adding, by the application, further key data into the cluster storage, in case a matching event is in the cluster storage;

sending, by the application, a personalized message to the emergency caller, using the available key data of the matching event in the cluster storage; and ending the method.

2. The method according to claim 1, wherein in case the optimization of the search key is not successful, the method further comprises:

adding, by the application, an abandoned event to the abandoned events without clustering; and ending the method.

3. The method according to claim 2, wherein in case the optimization of the search key is not successful, the method further comprises:

creating, by the application, a new entry of an incoming event into the cluster based on the previously prepared search key;

moving, by the application, the incoming event to the call handling system;

monitoring, by the application, a Real-Time-Protocol, RTP, streaming, and extracting, by the application, event key words;

updating, by the application, the entry into the cluster storage with the event key words; and ending the method.

4. The method according to claim 2, wherein in case the optimization of the search key is successful, the method further comprises:

adding, by the application, further key data into the cluster storage, in case a matching event is in the cluster storage;

sending, by the application, a personalized message to the emergency caller, using the available key data of the matching event in the cluster storage;

ending the method;

or optimizing, by the application, the search key, in case no matching event is in the cluster storage.

5. The method according to claim 2, wherein optimizing represents a tree diagram of the emergency data and their connection, wherein the search key starts from a corresponding optimization level based on the key data extracted from a new emergency call.

6. The method according to claim 1, wherein the application is an entity of the emergency system, a part of the Public Safety Answering Point, PSAP, and/or designed as a bot and/or as an Interactive Voice Responder, IVR, and/or the application can be running as an external component where the PSAP has access.

7. The method according to claim 1, wherein the key data are selected from the group comprising time, location locX and other parameters comprising ADR Y and ADR Z.

8. The method according to claim 7, wherein the parameters ADR Y and ADR Z are selected from Uniform Resource Name, URN, service SOS sub-service, an emergency call data service info-element, or an emergency call data comment-element.

9. The method according to claim 1, wherein the clustering is based on a location locX within a time-window t.

10. The method according to claim 1, wherein the key data are stored at corresponding optimization levels, preferably wherein there are up to three optimization levels.

11. A system for clustering emergency calls, wherein the system comprises an application configured to prepare a search key and optimize the search key when no matching event is found, and wherein the system is configured to perform the method according to claim 1.

12. The system according to claim 11, wherein the system comprises an Emergency Service Routing Proxy, ESRP, an application, a Public Safety Answering Point, PSAP and a cluster storage.

13. The system according to claim 12, wherein the application is an entity of the emergency system, a part of the Public Safety Answering Point, PSAP, or another component of the network system, and/or designed as a bot and/or as an Interactive Voice Responder, IVR and/or the application can be running as an external component where the PSAP has access.

14. The system according to claim 12, wherein the cluster storage contains the key data information in a node-tree architecture.

* * * * *